(12) United States Patent
Mazumder

(10) Patent No.: US 6,553,275 B1
(45) Date of Patent: Apr. 22, 2003

(54) IN-SITU STRESS MONITORING DURING DIRECT MATERIAL DEPOSITION PROCESS

(76) Inventor: Jyoti Mazumder, 5074 Birkdale, Ann Arbor, MI (US) 48103

( * ) Notice: Subject to any disclaimer, the term of this patent is extended or adjusted under 35 U.S.C. 154(b) by 0 days.

(21) Appl. No.: 09/522,671

(22) Filed: Mar. 10, 2000

Related U.S. Application Data

(60) Provisional application No. 60/123,890, filed on Mar. 11, 1999.

(51) Int. Cl.$^7$ .............................................. G06F 19/00
(52) U.S. Cl. .......................... 700/121; 700/98; 700/118
(58) Field of Search ................................ 700/119, 120, 700/121, 182, 258, 160; 419/7

(56) References Cited

U.S. PATENT DOCUMENTS

| | | | |
|---|---|---|---|
| 5,837,960 A | * | 11/1998 | Lewis et al. ............ 219/121.63 |
| 6,268,584 B1 | * | 7/2001 | Keicher et al. ......... 219/121.64 |
| 6,314,214 B1 | * | 11/2001 | Walter et al. ................. 385/12 |

OTHER PUBLICATIONS

Mazumder et al., "Rapid Manufacturing by Laser Aided Direct Deposition of Metals", Proceedings of Powder Metallurgy Conference, Jul. 1996, vol. 15, pp. 107–118.

Laser Material Processing', W.M. Steen, 1998 Springer.

\* cited by examiner

*Primary Examiner*—Leo Picard
*Assistant Examiner*—Kidesi Bahta
(74) *Attorney, Agent, or Firm*—Gifford, Krass, Groh, Sprinkle, Anderson & Citkowski, PC

(57) ABSTRACT

A system and method for monitoring and controlling in real-time the development of residual stress accumulation in a product during its fabrication by a laser-aided, computer-controlled, direct material deposition process. The system includes a laser source, a laser controller and a numerical controller. The material is deposited on a substrate which is equipped with strain gages on its back surface, i.e. the surface opposite to the surface on which material is deposited. The strain gages measure real-time changes in chosen locations and directions, typically in two orthogonal directions along and across the deposition direction. Acoustic and optical sensors are also mounted on locations appropriate for measurement. The strain gage, acoustic sensor and optical sensor measurements are sent to a computer with a stress analysis software package, which uses the strain data as an input to calculate the stress accumulation. The computer is programmed to determine whether critical conditions, such as a pre-determined fraction of the yield strength are reached at any location. Based on this information, the computer sounds a warning signal, or directs a command to the laser controller to adjust the parameters of the laser beam or the laser process, or directs the laser numerical controller to discontinue the process.

14 Claims, 4 Drawing Sheets

IN-SITU STRESS MONITORING DURING DIRECT MATERIAL DEPOSITION PROCESS

REFERENCE TO RELATED APPLICATIONS

This application claims priority of U.S. provisional patent application Serial No. 60/123,890 filed Mar. 11, 1999, the entire contents of which is incorporated herein by reference.

FIELD OF THE INVENTION

In general, this invention relates to laser-aided direct material deposition processes and, more particularly, to a system and method of monitoring residual stresses during laser-aided direct material deposition.

BACKGROUND OF THE INVENTION

During the process of laser-aided direct material deposition for cladding or fabrication of a product, residual stresses develop in the product. Residual stress accumulation leads to distortion and premature failure of the product during its use or operation. When the accumulated residual stresses exceed the yield strength of the material, cracking occurs during the fabrication process. Thermal expansion and sometimes phase transformation are the main contributors to residual stress. Most steels, for example, change from austenite with face centered cubic structure (FCC) to martensite with body centered tetragonal crystal structure (BCT) above a certain critical cooling rate. The specific volume of BCT is 4% higher than that of FCC, and therefore martensitic transformation produces considerable stress. Clearly, management of stress accumulation during the direct material deposition process is critical for the production of non-defective components with close tolerances and precise dimensions.

There are several techniques for post mortem, i.e., after fabrication or after failure, measurement of stress accumulation, but these techniques are not timely and do not save the product. To take corrective action, it is necessary to monitor the stress accumulation during the process. It is easier, however, to monitor strain and calculate stress using Hooke's law or other applicable stress-strain relationship for the material of the product. A method for measuring strain generated by direct material deposition has recently been reported by Mazumder et al., "Rapid Manufacturing by Laser Aided Direct Deposition of Metals", Proceedings of Powder Metallurgy Conference, July 1996, Vol. 15, pp. 107–118. This method utilizes a substrate especially designed for making test specimens. It has a middle thin section on top of which the deposition occurs, and two thick end sections, which remain bolted down during the laser deposition process. Two strain gauges are mounted on the back side of the specimen, i.e. the side opposite the material deposition side, in two orthogonal directions, X and Y. After one layer is deposited, the bolts are loosened, releasing the specimen, and then the strain is measured, from which the residual stress accumulation for the first layer can be calculated. From this residual stress value, the approximate number of layers required to exceed yield strength can be calculated. This method, useful as it may be, does not provide timely information to avoid frequent process interruptions for the purpose of relieving the build-up of residual stresses.

Background for the laser-aided direct metal deposition process can be found in "Laser Material Processing", W. M. Steen, 1998 Springer, and in U.S. patent application Ser. No. 09/107,912, filed Apr. 10, 1997, which is incorporated herein by reference.

SUMMARY OF THE INVENTION

The invention is directed to a system and method for monitoring and controlling in real-time the development of residual stress accumulation in a product during its fabrication by a laser-aided, computer-controlled, direct material deposition process. The system includes a laser source, a laser controller and a numerical controller. The material is deposited on a substrate which is equipped with strain gages on its back surface, i.e. the surface opposite to the surface on which material is deposited. The strain gages measure real-time changes in chosen locations and directions, typically in two orthogonal directions along and across the deposition direction. The strain gage measurements are sent to a computer with a stress analysis software package, which uses the strain data as an input to calculate the stress accumulation. The computer is programmed to determine whether critical conditions, such as a pre-determined fraction of the yield strength, are reached at any location. Based on this information, the computer sounds a warning signal, or directs a command to the laser controller to adjust the parameters of the laser beam or the laser process, or directs the laser numerical controller to discontinue the process.

In addition to the conventional strain gages, which will be referred to as purely mechanical strain sensors, sensors operating on other principles are employed to obtain measurements for determining in real time stress accumulation during the deposition process. Examples are acoustic sensors, which detect sound waves emitted by the product undergoing strain changes or phase transformations, and optical sensors operating on interferometric principles to detect strain. All non purely-mechanical sensors are first calibrated against purely-mechanical sensors. Multiple inputs from different type of sensors are integrated in a computer program, which performs a meta-analysis or fusion of data and determines the confidence level of the residual stress prediction based on the sensor inputs.

DETAILED DESCRIPTION OF THE INVENTION

Figure 1:
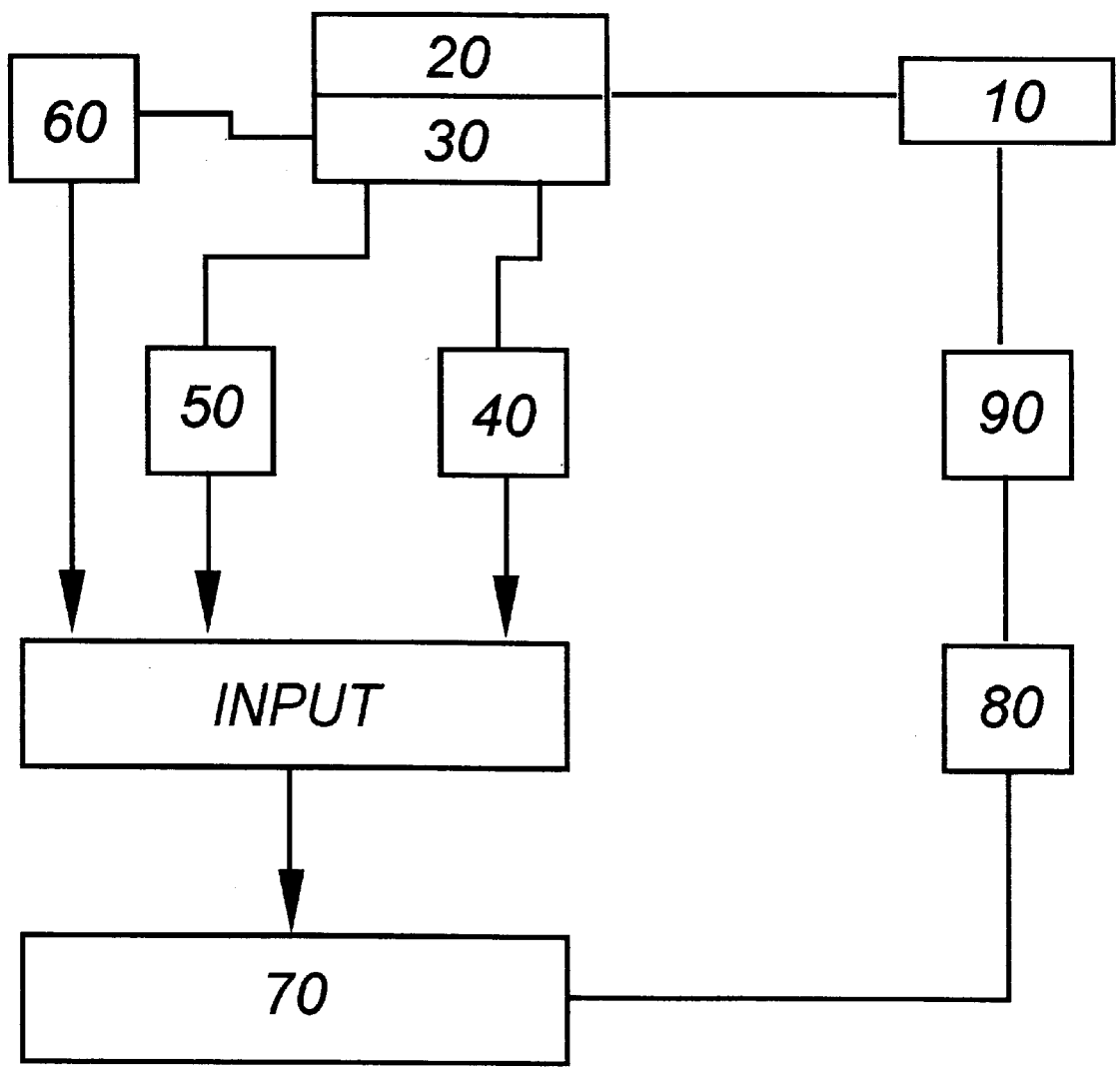
FIG. 1 is a schematic representation of the invention.

FIG. 1 is a schematic diagram of the invention. A laser-aided, computer controlled direct material deposition system 10 applies layers of material 20 on a substrate 30 to fabricate an object or cladding. The laser-aided direct material deposition system (DMD) is equipped with feedback monitoring and control of the dimensions and overall geometry of the fabricated article. The geometry of the article is provided by a computer-aided design system (CAD). The deposition tool path is generated by a computer-aided manufacturing system (CAM) for CNC machining with post-processing software for deposition, instead of software for removal as in conventional CNC machining. CAM software interfaces with the feedback controller. These details of the laser-aided, computer controlled direct material deposition system can be found in U.S. patent application Ser. No. 09/107,912, which is fully incorporated herein by reference, and are not all explicitly shown in FIG. 1.

The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 80 of the direct material deposition system typically cooperates directly with the numerical controller 90, which, itself, controls all functions of the direct material deposition system, including laser power.

The laser source (not shown) of the DMD system is mounted above the substrate 30 and a layer of material 20 is deposited according to the description of the object. The laser has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle co-axially with the beam.

The numerical controller 90 controls all operating components of the DMD system of FIG. 1, including the operating conditions of the laser, receiving direction from the CAD/CAM computer (not shown) for building the part or product. The numerical controller 90 also receives feedback control signals from the feedback controller 80 to adjust laser power output, and further controls the relative position of the substrate and laser spray nozzle. The CAD/CAM system is equipped with software which enables it to generate a path across the substrate for material deposition.

During the deposition process strain changes of in the deposited layers are monitored through several sensor systems. A mechanical strain gage system 40 includes conventional high-temperature strain gages attached to the back surface of the substrate 30. The strain gages 40 measure strain in predetermined locations and directions, typically X, Y directions, along and across the deposition path. These gages are attached on the back of the substrate with high-temperature solder or other temperature-resistant means to avoid damage from laser heat or stray reflection from the laser beam.

Additional not-purely-mechanical sensors systems are incorporated, preferably acoustic sensors 60 and optical sensors 50. The acoustic sensors operate on the principle that during material deposition strains and other physical changes, such as phase transformation changes, or crack/defect initiation produce sound waves which can be picked up by the acoustic sensors 60. The acoustic sensors 60 are typically piezoelectric. Currently miniaturized acoustic sensors are used for micro electrical mechanical systems (MEMS). U.S. Pat. Nos. 4,783,821 and 4,816,125, for example, disclose a miniature diaphragm pressure transducer. The acoustic sensors, whether miniaturized or not, are basically micro-microphones or microphones, respectively, which convert sound waves to electrical signals. The optical sensors 50 include a variety of devices, such as those operating on photovoltaic, fiber optic, and interferometric principles. Using an optical detector and an interference measuring technique, small strains can be measured with high sensitivity. The acoustic sensors and optical sensors must be calibrated against independent (mechanical) strain-gage measurements. The acoustic sensors, in particular, require careful calibration to distinguish strain from other sources of acoustic emission from the product, such as crack initiation, defect formation, and phase transformation, during the fabrication of the product through laser-aided material deposition. The acoustic sensors 60, optical sensors 50 and strain gages 40, send their strain measurements during the deposition process to a computer 70 in the form of electrical signals. A rough estimate of stresses may be obtained through linear stress strain relations and elementary beam theory, but a complete residual stress history requires the incorporation of finite element codes, such as those commercially available for linear and nonlinear systems. The computer 70 is programmed to offer both of these options: a rough calculation for experimental purposes during product design and development, and a full-fledged finite element analysis for more accurate prediction during actual production. The computer program compares the results of the stress-strain calculation with pre-determined failure criteria which incorporate a safety factor. The simplest criterion is to compare the maximum tensile stress with the yield stress and require the ratio not to exceed a given value. For ductile materials and multiaxial stresses, more sophisticated failure criteria may be incorporated in the stress analysis computer program, such as the von Mises or maximum strain energy criterion, or even crack initiation and propagation theories may be applied. Based on the results of the failure analysis, the computer either issues a warning/alarm signal for a human operator, or sends appropriate commands to a feedback controller 80, which interfaces with a numerical controller 90. The numerical controller initiates corrective action, such as termination of the deposition process, adjustment of the deposition rate or laser power, and changes in the cooling conditions.

Figure 2A:
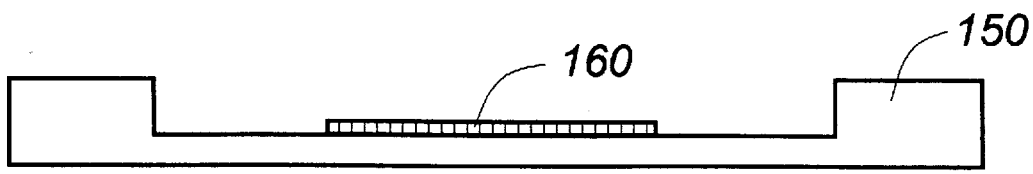
FIG. 2a is a drawing of a side view of the substrate.
Figure 2B:
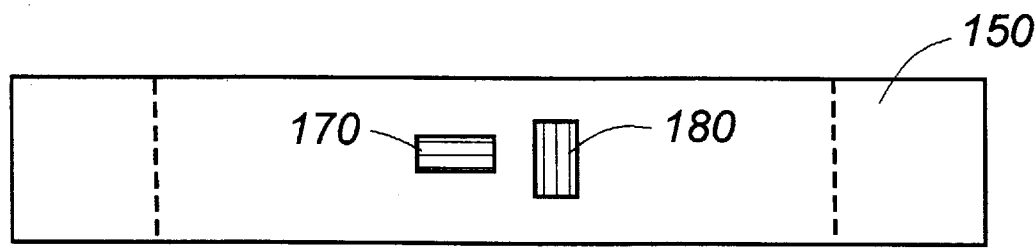
FIG. 2b is a drawing of a plan view of the back surface of the substrate.

FIG. 2 shows one embodiment of the substrate 150 of the invention. FIG. 2a is a side view of the substrate 150 also showing one layer of clad material 160. FIG. 2b is a plan view of the back surface of the substrate, i.e. the surface opposite to the top surface on which material deposition takes place. In this embodiment two high-temperature strain gages 170, 180 have been mounted on the back surface of the substrate, one strain gage 170 in the longitudinal and the other strain gage 180 in the transverse direction of the substrate. The solder or other means of mounting the gages is also made of high-temperature resistant materials. The substrate is simply supported (pinned) at the ends (supports not shown). The geometry of the substrate was chosen as convenient for making specimens to test new products. The geometry of the substrate is, in general, dictated by the geometry of the object to be fabricated.

Figure 3:
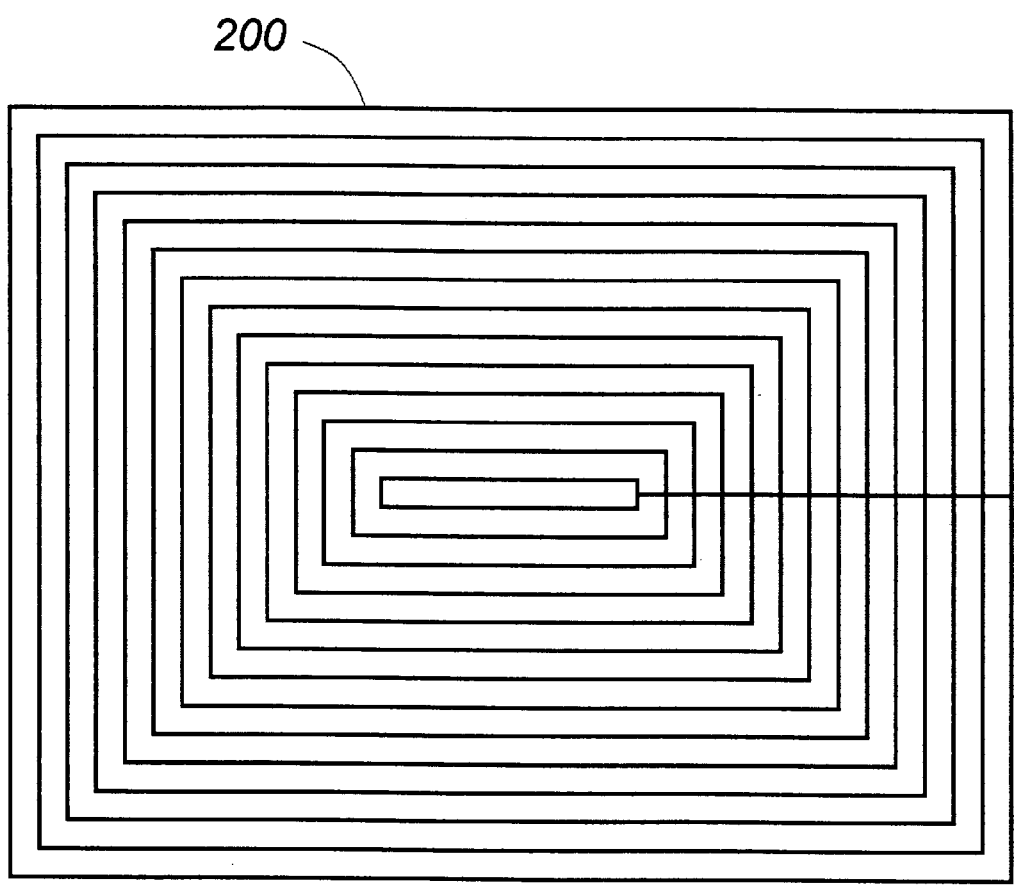
FIG. 3 is a diagram of the laser deposition path.

FIG. 3 shows a diagram of the laser deposition path 200, which is a sequence of nested rectangles. The path starts at the innermost rectangle and moves outwards, or it starts at the outermost rectangle and moves inwards. The typical track height is 250 mm, the track width 500 $\mu$m and the track overlap 50%. The track width and height can be varied with laser power and feed.

Figure 4:
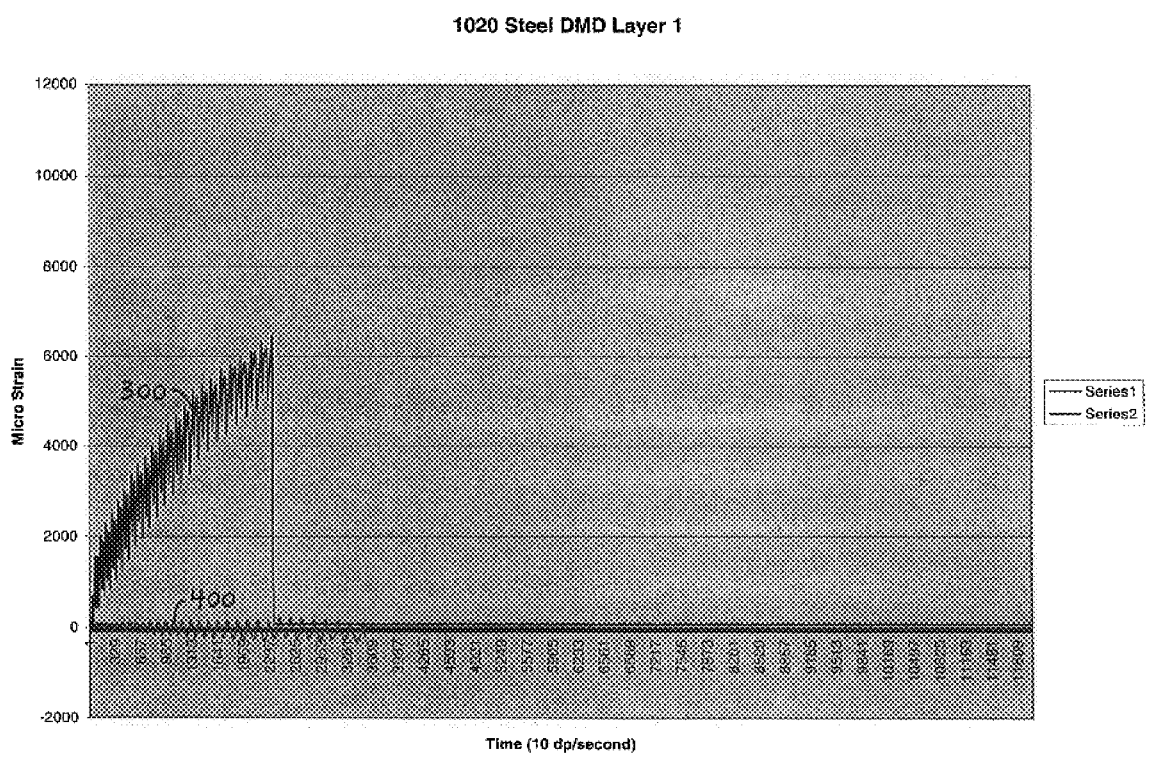
FIG. 4 is a graph showing the strain as a function of time during the deposition of one layer for one test.

FIG. 4 is a graph of micro strain versus time obtained during a one-layer deposition of 1020 steel, which lasted for approximately 18 minutes. The top curve 300 on the graph corresponds to strain in the longitudinal direction and the bottom curve 400 corresponds to strain in the transverse direction. For the geometry of the substrate shown in FIG. 2, the transverse strain is 0, while the longitudinal strain rises sharply. In this test, the strain gage measurements terminated at about 3.8 minutes.

Figure 5:
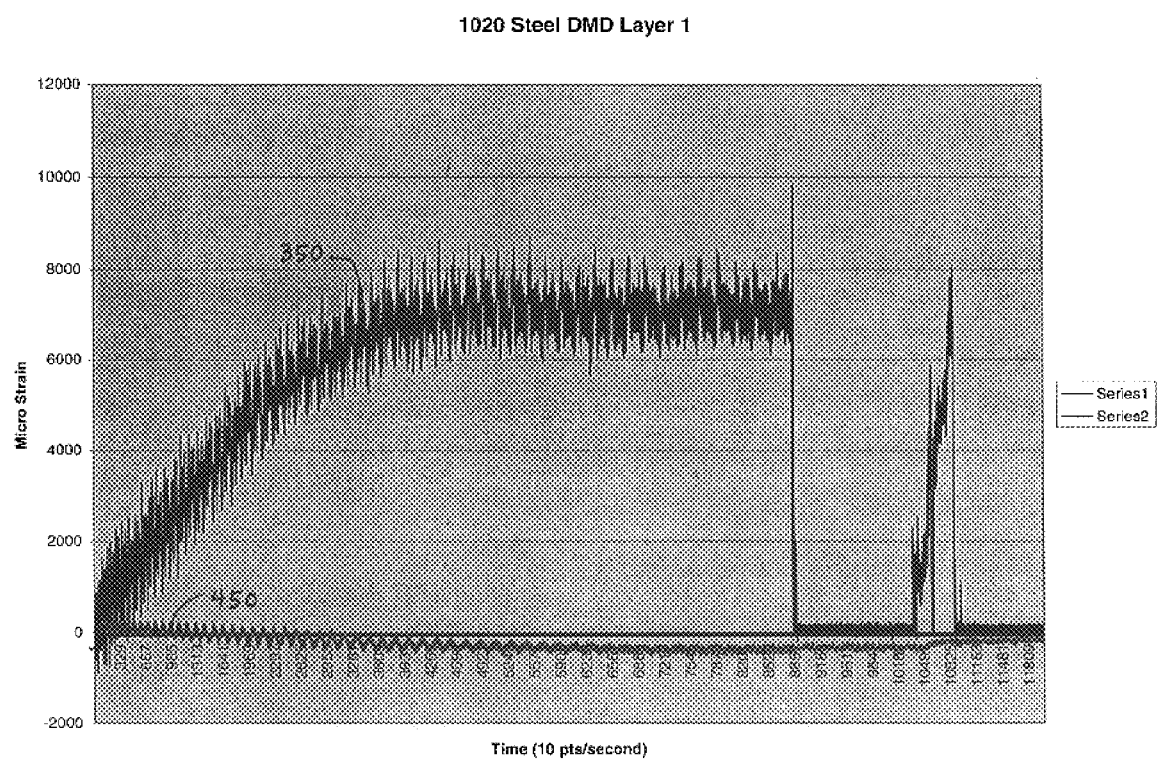
FIG. 5 is a graph showing the strain as a function of time during the deposition of one layer for another test.

FIG. 5 shows the results of another test with the same material and geometry of specimen as in FIG. 4. The top curve 350 on the graph corresponds to strain in the longitudinal direction and the bottom curve 450 corresponds to strain in the transverse direction, as in FIG. 4. The strain in the transverse direction is again zero, while the strain in the longitudinal direction rises with the same slope as in the test of FIG. 4, and then reaches a plateau.

Although FIGS. 4 and 5 show the residual strain history for one layer of cladding, the strain history is monitored during the entire fabrication process, i.e. until the object is built. The residual strain is measured for each layer deposited, in many locations, both on the substrate and on the object though non-contact sensors such as optical sensors. From this information, a finite element program can determine the complete residual stress history for the object undergoing fabrication, during the fabrication process. The geometry and dimensions of the substrate are dictated by the geometry of the article to be fabricated, as well as convenience.

I claim:

1. A method of fabricating a product, comprising the steps of:

a) using a laser-aided, computer-controlled direct material deposition system to fabricate the product on a substrate by depositing successive layers having a height;

b) measuring the strain with sensors in real-time during material deposition;

c) inputting the strain into a computer program to calculate the real-time stress accumulation; and d) adjusting the material deposition process to control residual stress accumulation.

2. The method of claim 1, wherein the direct metal deposition system of step a) includes a feedback controller for controlling the height of each deposited layer.

3. The method of claim 1, wherein the computer program of step c) is a finite-element analysis program.

4. The method of claim 1, wherein the substrate has a top surface on which the material is deposited and a back surface, and wherein step b) uses at least one mechanical strain gage attached to the back surface of the substrate.

5. The method of claim 1, wherein step b) uses an acoustic sensor to provide input to the computer program.

6. The method of claim 1, wherein step b) uses an optical sensor to provide input to the computer program.

7. A system, comprising:

a laser-aided, computer-controlled direct material deposition system for fabricating an article by depositing successive material layers having a height on a substrate, the substrate having a top surface on which the material is deposited, and a back surface;

at least one strain-gage sensor attached to the back surface of the substrate;

a computer programmed to receive input from the sensor and calculate real-time residual stress accumulation; and a controller interfacing with the computer and operating to adjust the laser deposition process to control residual stress accumulation.

8. The system of claim 7, wherein the material deposition system uses a feedback controller to control the height of each deposited layer.

9. The system of claim 7, further including an acoustic sensor providing real-time input to the computer for the residual stress calculation.

10. The system of claim 7, including an optical sensor providing input to the computer for the real-time residual stress calculation.

11. An automated system for real-time monitoring and controlling residual stress accumulation of an article during its fabrication, the system comprising:

a laser-aided direct material deposition system for fabricating an article by depositing successive material layers having a height on a substrate;

a plurality of sensors positioned to receive input from the article during its fabrication; and a computer receiving the outputs from the sensors, the computer interfacing with the feedback controller, the controller interfacing with a numerical controller operating to control the material deposition process.

12. The system of claim 11, wherein the laser-aided direct material deposition system is capable of controlling the height of each deposited layer with feedback control.

13. The system of claim 11, wherein one of the sensors is an acoustic sensor detecting sound waves emitted from the article during its fabrication.

14. The system of claim 11, wherein one sensor is an optical sensor operating on interferometric principles.

* * * * *